United States Patent
Huang et al.

(10) Patent No.: US 11,453,960 B2
(45) Date of Patent: Sep. 27, 2022

(54) ALGAE MODIFIED PP SPUNBOND NON-WOVEN FABRIC

(71) Applicants: SINOTECH ACADEMY OF TEXTILE (QINGDAO) CO., LTD., Shandong (CN); BESTEE MATERIAL (TSINGTAO) CO., LTD., Shandong (CN)

(72) Inventors: Xiaohua Huang, Shandong (CN); Xiaoqian Huang, Shandong (CN); Yu Liu, Shandong (CN); Jie Liu, Shandong (CN); Xiaolong Huang, Shandong (CN); Li Zhen, Shandong (CN)

(73) Assignees: SINOTECH ACADEMY OF TEXTILE (Qingdao) Co., LTD., Shandong (CN); BESTEE MATERIAL (Tsingtao) CO., LTD., Shandong (CN)

( * ) Notice: Subject to any disclaimer, the term of this patent is extended or adjusted under 35 U.S.C. 154(b) by 230 days.

(21) Appl. No.: 17/010,068

(22) Filed: Sep. 2, 2020

(65) Prior Publication Data
US 2021/0062368 A1  Mar. 4, 2021

(30) Foreign Application Priority Data
Sep. 2, 2019 (CN) .......................... 201910822451.6

(51) Int. Cl.
*D01F 1/10* (2006.01)
*D01F 6/46* (2006.01)
*D04H 3/007* (2012.01)
*D04H 3/14* (2012.01)
*C08L 5/04* (2006.01)
*D04H 3/16* (2006.01)

(52) U.S. Cl.
CPC ................ *D01F 1/103* (2013.01); *C08L 5/04* (2013.01); *D01F 6/46* (2013.01); *D04H 3/007* (2013.01); *D04H 3/14* (2013.01); *D04H 3/16* (2013.01)

(58) Field of Classification Search
CPC ... C08L 5/04; D01F 1/10; D01F 1/103; D01F 6/06; D01F 6/44; D01F 6/46; D01F 9/04; D04H 3/007; D04H 3/14; D04H 3/16
See application file for complete search history.

(56) References Cited

FOREIGN PATENT DOCUMENTS

| CN | 102336929 B | | 2/2012 | |
|----|-------------|---|--------|---|
| CN | 102336961 B | | 2/2012 | |
| CN | 103132319 A | | 6/2013 | |
| CN | 103692706 A | * | 4/2014 | |
| CN | 106049047 A | * | 10/2016 | ............ B01J 20/265 |
| CN | 107974831 A | * | 5/2018 | .......... D06M 11/155 |
| CN | 208760115 U | | 4/2019 | |

* cited by examiner

*Primary Examiner* — Michael A Tolin
(74) *Attorney, Agent, or Firm* — Juan Carlos A. Marquez; Marquez IP Law Office, PLLC

(57) ABSTRACT

The present invention discloses an algae modified pp spunbond non-woven fabric, which contains 0.1-2% of alginate. The algae modified pp spunbond non-woven fabric has a moisture regain of 0.2-3.5%, and an antibacterial rate ≥98%. The algae modified pp spunbond non-woven fabric prepared in the invention contains modified alginic acid, and also has hydrophilic functional groups, such as hydroxyl and amido groups, and hydrophobic functional groups such as branched alkyl groups. After spinning with pp into non-woven fabrics, protons can be both generated and received, so that when liquid is encountered on the surface of non-woven fabrics, the surface tension of liquid can be significantly reduced; additionally, there are a large number of gaps in the dense interpenetrating network structure formed by the modified alginic acid, which forms a structure like sponge having good hygroscopicity; moreover, the algae modified pp spunbond non-woven fabric absorbs water rapidly, the surface remains dry after absorbing water, and it can absorb many times its mass of water, so it has an excellent hydrophilicity.

6 Claims, No Drawings

ALGAE MODIFIED PP SPUNBOND NON-WOVEN FABRIC

TECHNICAL FIELD

The present invention relates to the technical field of spunbond non-woven fabrics, and specifically relates to an algae modified pp spunbond non-woven fabric.

BACKGROUND

PP spunbond non-woven fabrics are of breathable and impermeable structures formed from polypropylene by high temperature jet spinning, carding and bonding into the net, which are mainly used in disposable medical and hygiene products, disposable antifouling suits, agricultural cloth, furniture cloth and used as lining materials. The surface layers of the existing pp spunbond non-woven fabric hygiene products are mostly perforated films, hot wind non-woven fabrics and pure cotton spunlace non-woven fabrics, which have the following problems: for example, the perforated film non-woven fabrics have poor air permeability; the hot wind non-woven fabrics have good dry touch but poor biocompatibility, as well as strong burr touch; and the pure cotton spunlace non-woven fabrics have bad dry touch, and are prone to generate the feeling of dampness and adhesion.

Additionally at present, pp spunbond non-woven fabrics are also faced with the problem of considering both air permeability and mechanical properties at the same time. For example, Chinese Patent CN 102336961 B discloses a pp spunbond non-woven fabric composite material modified by ground calcium carbonate and corn starch, and Chinese Patent CN 102336929 B discloses a pp spunbond non-woven fabric modified by corn starch. They are both environmentally friendly and biodegradable. However, the addition of corn starch resulted in the reduction of breaking strength and poor mechanical properties of the non-woven fabrics.

Chinese Patent Publication No. CN208760115U discloses an antibacterial spunbond non-woven fabric, including, from top to bottom, the first ionic sterilizing layer, the first bamboo charcoal fiber layer, the first spunbond non-woven fabric layer, the first resin adhesive layer, the strengthening basement layer, the second resin adhesive layer, the second spunbond non-woven fabric layer, the second bamboo charcoal fiber layer, and the second ionic sterilizing layer successively bonded; wherein, the first spunbond non-woven fabric layer is made of antibacterial polypropylene spunbond non-woven fabrics, the antibacterial polypropylene spunbond non-woven fabrics are prepared by spunbonding the antibacterial and degradable polypropylene spunbond non-woven fabric master batches; the second spunbond non-woven fabric layer is made of polyethylene polypropylene spunbond non-woven fabrics, the polyethylene polypropylene spunbond non-woven fabrics are prepared by spunbonding the antibacterial polyethylene polypropylene spunbond non-woven fabric master batches. This patent only briefly introduces the structure of the antibacterial non-woven fabrics, the specific preparation process is not disclosed, and it does not solve the technical problems of moisture absorption and air permeability of the spunbond non-woven fabrics.

Chinese Patent Publication No. CN103132319A discloses a flame retardant spunbond non-woven fabric, the preparation method and application thereof. The flame retardant spunbond non-woven fabric is made from the following components in parts by weight: 60-80 parts of spunbond non-woven fabrics, 15-30 parts of flame retardants and 5-10 parts of coupling agents. Its preparation method is as below: 15-30 parts of flame retardants are weighed and formulated into an aqueous solution at a mass fraction of 15-30% to form a flame retardant liquid; 5-10 parts of coupling agents are added into the flame retardant liquid and stirred evenly to form a mixed liquid; 60-80 parts of spunbond non-woven fabrics are then soaked in the above mixed liquid for 10-20 min; and finally the soaked spunbond non-woven fabrics are extruded between two rubber rollers of the roller press, and oven-dried to prepare the flame retardant spunbond non-woven fabrics. The obtained flame retardant spunbond non-woven fabrics are overlapped, acupunctured for reinforcing and cut according to specifications to obtain the decoration materials for automobiles. The obtained flame retardant spunbond non-woven fabrics are rinsed, dried in air, cut into sizes according to specifications to obtain household textile materials. This patent solves the technical problem of flame retardant of the spunbond non-woven fabrics, but the technical problems of moisture absorption and air permeability have not been solved yet.

In conclusion, it is urgent to develop a non-woven fabric product with good hygroscopicity and air permeability, good antibacterial property, soft and skin-friendly, good biocompatibility and excellent mechanical properties.

SUMMARY

To solve the above problems, the present invention aims to provide an algae modified pp spunbond non-woven fabric.

To achieve the above objective, the present invention is realized by the following technical scheme:

An algae modified pp spunbond non-woven fabric, wherein: the PP spunbond non-woven fabric contains 0.1-2% of alginate.

The algae modified pp spunbond non-woven fabric has a moisture regain of 0.2-3.5% and an antibacterial rate ≥98%;

The alginate in the algae modified pp spunbond non-woven fabric is generated by modifying alginic acid; the raw materials for preparing the algae modified pp spunbond non-woven fabric further include polypropylene, polyethylene glycol, polyvinyl pyrrolidone and an antioxidant;

The antioxidant is Antioxidant 3125 or Antioxidant 2013;

Wherein, alginate is prepared through the following steps: Alginic acid is dissolved in a solvent, into which are added 1-(3-dimethylaminopropyl)-3-ethyl carbodiimide hydrochloride and N-hydroxy succinimide at 10~35° C. and reacted with stirring for 5~10 hours to get a reaction solution; polyamine is added into the reaction solution and reacted with stirring at 40~80° C. for 10~24 hours to get a mixed solution; deionized water is added into the mixed solution and dialyzed by a dialysis bag with a molecular weight of 3500 to get a dialysate; the dialysate is lyophilized to get the modified alginic acid;

The solvent is N,N-dimethylformamide or dimethyl sulfoxide;

The polyamine is hexamethylenediamine or tri(2-aminoethyl)amine;

The mass ratio of alginic acid, the solvent, 1-(3-dimethylaminopropyl)-3-ethyl carbodiimide hydrochloride, N-hydroxy succinimide, polyamine and deionized water is 100: 300~600:5~15:7~14:1~10:300~600.

For preparing the alginate in the invention, a cross-linked modified alginic acid is obtained by the reacting the carboxyl groups in alginic acid with the amino groups in polyamine, to form a dense interpenetrating network structure, and a dialysis bag is used to entrap macromolecules with molecular weights above 3500. On one hand, the algae modified pp spunbond non-woven fabric retains the rapid degradation performance of alginic acid; on the other hand, the network structure of macromolecules ensures the high mechanical strength and wear resistance of non-woven fabrics; since the modified alginic acid has both hydrophilic functional groups, such as hydroxyl and amido groups, and hydrophobic functional groups such as branched alkyl groups, so after spinning with pp into non-woven fabrics, the properties similar to those of amphoteric surfactants are formed in pp fibers, so that when liquid is encountered on the surface of non-woven fabrics, the surface tension of liquid can be significantly reduced, enabling the non-woven fabrics have good hygroscopicity and dry touch; additionally, there are a large number of gaps in the dense interpenetrating network structure formed by the modified alginic acid, which forms a structure like sponge capable of absorbing water rapidly and in large quantities.

Preferably, polyethylene glycol is Polyethylene glycol 4000 or Polyethylene glycol 6000. The preferable kind of polyethylene glycol has modest molecular weight, by which the tensile strength of the algae modified pp spunbond non-woven fabric can be improved by 10~15%.

Preferably, polyvinyl pyrrolidone is Polyvinyl pyrrolidone K30. The preferable Polyvinyl pyrrolidone K30 has low viscosity, which makes the non-woven fabric more smooth.

Addition of an appropriate proportion of polyethylene glycol and polyvinyl pyrrolidone can enhance the compatibility between alginate and polypropylene, reduce the roughness of a single material after melting of alginate and polypropylene, and increase the smoothness of the non-woven fabric.

The present invention further includes a method of preparing the algae modified pp spunbond non-woven fabric, including the following steps:

① polypropylene and alginate accounting for 0.1-2% of the total weight are added into a horizontal double helical ribbon mixer at a certain mass ratio, heated to 40~80° C., and mixed at a medium speed for 20~40 minutes, into which are then added polyethylene glycol, polyvinyl pyrrolidone and an antioxidant, heated to 180~190° C., and mixed at a high speed for 20~40 minutes, to get a mixture; Wherein, the alginate is prepared following the steps below:

Alginic acid is dissolved in a solvent, into which are added 1-(3-dimethylaminopropyl)-3-ethyl carbodiimide hydrochloride and N-hydroxy succinimide at 10~35° C. and reacted with stirring for 5~10 hours to get a reaction solution; polyamine is added into the reaction solution and reacted with stirring at 40~80° C. for 10~24 hours to get a mixed solution; deionized water is added into the mixed solution and dialyzed by a dialysis bag with a molecular weight of 3500 to get a dialysate; the dialysate is lyophilized to get the alginate;

The antioxidant is Antioxidant 3125 or Antioxidant 2013; The antioxidant is mainly used to prevent the carbonization of alginate when added to high temperature polypropylene; Antioxidant 3125 or Antioxidant 2013 has better flowability and adhesiveness, they can reduce the carbonization degree of the modified alginic acid significantly, and prevent the change of structure and loss of function of the modified alginate due to carbonization.

② the mixture obtained from step ① is injected into a spinning box, where it is jet spun and drawn to get a fiber mesh, the fiber mesh is hot rolled into cloth on a hot rolling machine, to get the algae modified pp spunbond non-woven fabric.

In a preferable preparation method, the temperature for rolling the fiber mesh on the hot rolling machine in step ② is 140~150° C.

In a preferable preparation method, the operating pressure for injecting the melt into the spinning box in step ② is 2~5 MPa.

The present invention further includes a use of the algae modified pp spunbond non-woven fabric in disposable medical and hygiene products, such as feminine hygiene, baby dry-shod napkins, wet wipes, nursing pads.

Compared with the prior art, the present invention has the following advantages:

1. Since the modified alginic acid has both hydrophilic functional groups, such as hydroxyl and amido groups, and hydrophobic functional groups such as branched alkyl groups, so after spinning with pp into non-woven fabrics, the properties similar to those of amphoteric surfactants are formed in pp fibers, that is, protons can be both generated and received, so that when liquid is encountered on the surface of non-woven fabrics, the surface tension of liquid can be significantly reduced, enabling the non-woven fabrics have good hygroscopicity and dry touch; additionally, there are a large number of gaps in the dense interpenetrating network structure formed by the modified alginic acid, which forms a structure like sponge with a good hygroscopicity; the non-woven fabric can absorb water rapidly and the surface remains dry after absorbing water; moreover, the non-woven fabric can absorb more than 12 times its mass of water, so it has good hydrophilcity, the convention moisture regain is between 0.2-3.5%.

2. The modification of alginic acid allows the prepared PP spunbond non-woven fabric to have excellent antibacterial property, with the comprehensive antibacterial rate above 98%.

3. The modification of alginic acid allows the fiber to have the network structure of macromolecules, ensuring that the non-woven fabric can have high mechanical strength and wear resistance; its breaking strength and elongation at break are about 20% higher than those of conventional pp spunbond non-woven fabrics, and the wear resistance is at least 30% higher than that of conventional products.

4. Due to the microcellular structure, the algae modified pp spunbond non-woven fabric of the invention has an air permeability that is more than one time that of the conventional pp spunbond non-woven fabrics, so it has excellent air permeability and hygroscopicity; compared with the moisture regain of synthetic fibers in the industry of almost 0, the algae modified pp spunbond non-woven fabric of the invention is a major breakthrough.

5. The algae modified pp spunbond non-woven fabric of the invention is soft and skin-friendly, it has good biocompatibility.

DESCRIPTION OF THE EMBODIMENTS

The present invention will be further described with reference to the following specific embodiments.

Embodiment 1

An algae modified pp spunbond non-woven fabric, including the following raw materials: polypropylene 90 kg, modified alginic acid 0.2 kg, polyethylene glycol 1 kg, polyvinyl pyrrolidone 0.3 kg and an antioxidant 0.3 kg;

The antioxidant is Antioxidant 3125;
Wherein the modified alginic acid is prepared following the steps below:
100 kg alginic acid is dissolved in 300 kg N,N-dimethylformamide, into which are added 5 kg 1-(3-dimethylaminopropyl)-3-ethyl carbodiimide hydrochloride and 7 kg N-hydroxy succinimide at 10° C. and reacted with stirring for 10 hours to get a reaction solution; 1 kg hexamethylenediamine is added into the reaction solution and reacted with stirring at 40° C. for 10 hours to get a mixed solution; 300 kg deionized water is added into the mixed solution and dialyzed by a dialysis bag with a molecular weight of 3500 to get a dialysate; the dialysate is lyophilized to get the modified alginic acid.

Embodiment 2

An algae modified pp spunbond non-woven fabric, including the following raw materials: polypropylene 100 kg, modified alginic acid 1 kg, polyethylene glycol 5 kg, polyvinyl pyrrolidone 0.1 kg and an antioxidant 0.6 kg;
The antioxidant is Antioxidant 2013;
Wherein the modified alginic acid is prepared following the steps below:
100 kg alginic acid is dissolved in 600 kg dimethyl sulfoxide, into which are added 15 kg 1-(3-dimethylaminopropyl)-3-ethyl carbodiimide hydrochloride and 14 kg N-hydroxy succinimide at 35° C. and reacted with stirring for 5 hours to get a reaction solution; 10 kg tri(2-aminoethyl)amine is added into the reaction solution and reacted with stirring at 80° C. for 24 hours to get a mixed solution; 600 kg deionized water is added into the mixed solution and dialyzed by a dialysis bag with a molecular weight of 3500 to get a dialysate; the dialysate is lyophilized to get the modified alginic acid.

Embodiment 3

An algae modified pp spunbond non-woven fabric, including the following raw materials: polypropylene 94 kg, modified alginic acid 1.2 kg, polyethylene glycol 4 kg, polyvinyl pyrrolidone 0.15 kg and an antioxidant 0.4 kg;
The antioxidant is Antioxidant 3125;
Wherein the modified alginic acid is prepared following the steps below:
100 kg alginic acid is dissolved in 400 kg N,N-dimethylformamide, into which are added 10 kg 1-(3-dimethylaminopropyl)-3-ethyl carbodiimide hydrochloride and 10 kg N-hydroxy succinimide at 25° C. and reacted with stirring for 4 hours to get a reaction solution; 5 kg hexamethylenediamine is added into the reaction solution and reacted with stirring at 50° C. for 14 hours to get a mixed solution; 400 kg deionized water is added into the mixed solution and dialyzed by a dialysis bag with a molecular weight of 3500 to get a dialysate; the dialysate is lyophilized to get the modified alginic acid.

Embodiment 4

An algae modified pp spunbond non-woven fabric, including the following raw materials: polypropylene 95 kg, modified alginic acid 1.5 kg, Polyethylene glycol 4000 3 kg, Polyvinyl pyrrolidone K30 0.2 kg and an antioxidant 0.5 kg;
The antioxidant is Antioxidant 3125;
Wherein the modified alginic acid is prepared following the steps below:
100 kg alginic acid is dissolved in 400 kg dimethyl sulfoxide, into which are added 8 kg 1-(3-dimethylaminopropyl)-3-ethyl carbodiimide hydrochloride and 10 kg N-hydroxy succinimide at 20° C. and reacted with stirring for 5 hours to get a reaction solution; 6 kg polyamine is added into the reaction solution and reacted with stirring at 60° C. for 15 hours to get a mixed solution; 450 kg deionized water is added into the mixed solution and dialyzed by a dialysis bag with a molecular weight of 3500 to get a dialysate; the dialysate is lyophilized to get the modified alginic acid.

Embodiment 5

An algae modified pp spunbond non-woven fabric, including the following raw materials: polypropylene 95 kg, modified alginic acid 1.9 kg, Polyethylene glycol 6000 3 kg, Polyvinyl pyrrolidone K30 0.2 kg and an antioxidant 0.5 kg;
The antioxidant is Antioxidant 3125;
Wherein the modified alginic acid is prepared following the steps below:
100 kg alginic acid is dissolved in 400 kg dimethyl sulfoxide, into which are added 8 kg 1-(3-dimethylaminopropyl)-3-ethyl carbodiimide hydrochloride and 10 kg N-hydroxy succinimide at 20° C. and reacted with stirring for 5 hours to get a reaction solution; 6 kg polyamine is added into the reaction solution and reacted with stirring at 60° C. for 15 hours to get a mixed solution; 450 kg deionized water is added into the mixed solution and dialyzed by a dialysis bag with a molecular weight of 3500 to get a dialysate; the dialysate is lyophilized to get the modified alginic acid.

Embodiment 6

The algae modified pp spunbond non-woven fabric described in embodiment 1 is prepared by a method including the following steps:
① 90 kg polypropylene and 0.2 kg modified alginic acid are added into a horizontal double helical ribbon mixer, heated to 40° C., and mixed at a medium speed for 20 minutes, into which are then added 1 kg polyethylene glycol, 0.3 kg polyvinyl pyrrolidone and 0.3 kg antioxidant, heated to 180° C. and mixed at a high speed for 20 minutes, to get a mixture liquid;
Wherein the modified alginic acid is prepared following the steps below:
100 kg alginic acid is dissolved in 300 kg N,N-dimethylformamide, into which are added 5 kg 1-(3-dimethylaminopropyl)-3-ethyl carbodiimide hydrochloride and 7 kg N-hydroxy succinimide at 10° C. and reacted with stirring for 10 hours to get a reaction solution; 1 kg hexamethylenediamine is added into the reaction solution and reacted with stirring at 40° C. for 10 hours to get a mixed solution; 300 kg deionized water is added into the mixed solution and dialyzed by a dialysis bag with a molecular weight of 3500 to get a dialysate; the dialysate is lyophilized to get the modified alginic acid; The antioxidant is Antioxidant 3125;
② The mixture liquid obtained from step ① is injected into a spinning box, where it is jet spun, cooled by a quenching air case, and drawn to get a fiber mesh, the fiber mesh is hot rolled into cloth on a hot rolling machine, to get the algae modified pp spunbond non-woven fabric.

Embodiment 7

The algae modified pp spunbond non-woven fabric described in embodiment 2 is prepared by a method including the following steps:

① 100 kg polypropylene and 0.9 kg modified alginic acid are added into a horizontal double helical ribbon mixer, heated to 80° C., and mixed at a medium speed for 40 minutes, into which are then added 5 kg polyethylene glycol, 0.1 kg polyvinyl pyrrolidone and 0.6 kg Antioxidant 2013, heated to 190° C. and mixed at a high speed for 40 minutes, to get a mixture liquid;

Wherein the modified alginic acid is prepared following the steps below:

100 kg alginic acid is dissolved in 600 kg dimethyl sulfoxide, into which are added 15 kg 1-(3-dimethylaminopropyl)-3-ethyl carbodiimide hydrochloride and 14 kg N-hydroxy succinimide at 35° C. and reacted with stirring for 5 hours to get a reaction solution; 10 kg tri(2-aminoethyl)amine is added into the reaction solution and reacted with stirring at 80° C. for 24 hours to get a mixed solution; 600 kg deionized water is added into the mixed solution and dialyzed by a dialysis bag with a molecular weight of 3500 to get a dialysate; the dialysate is lyophilized to get the modified alginic acid;

② The mixture liquid obtained from step ① is injected into a spinning box, where it is jet spun, cooled by a quenching air case, and drawn to get a fiber mesh, the fiber mesh is hot rolled into cloth on a hot rolling machine, to get the algae modified pp spunbond non-woven fabric.

Embodiment 8

The algae modified pp spunbond non-woven fabric described in embodiment 3 is prepared by a method including the following steps:

① 94 kg polypropylene and 1.2 kg modified alginic acid are added into a horizontal double helical ribbon mixer, heated to 50° C., and mixed at a medium speed for 25 minutes, into which are then added 4 kg polyethylene glycol, 15 kg polyvinyl pyrrolidone and 0.4 kg antioxidant, heated to 182° C. and mixed at a high speed for 25 minutes, to get a mixture liquid;

Wherein the modified alginic acid is prepared following the steps below:

100 kg alginic acid is dissolved in 400 kg N,N-dimethylformamide, into which are added 10 kg 1-(3-dimethylaminopropyl)-3-ethyl carbodiimide hydrochloride and 10 kg N-hydroxy succinimide at 25° C. and reacted with stirring for 4 hours to get a reaction solution; 5 kg hexamethylenediamine is added into the reaction solution and reacted with stirring at 50° C. for 14 hours to get a mixed solution; 400 kg deionized water is added into the mixed solution and dialyzed by a dialysis bag with a molecular weight of 3500 to get a dialysate; the dialysate is lyophilized to get the modified alginic acid;

The antioxidant is Antioxidant 3125;

② The mixture liquid obtained from step ① is injected into a spinning box, where it is jet spun, cooled by a quenching air case, and drawn to get a fiber mesh, the fiber mesh is hot rolled into cloth on a hot rolling machine, to get the algae modified pp spunbond non-woven fabric.

Embodiment 9

The algae modified pp spunbond non-woven fabric described in embodiment 4 is prepared by a method including the following steps:

① 95 kg polypropylene and 1.5 kg modified alginic acid are added into a horizontal double helical ribbon mixer, heated to 60° C., and mixed at a medium speed for 30 minutes, into which are then added 3 kg Polyethylene glycol 4000, 0.2 kg Polyvinyl pyrrolidone K30 and 0.5 kg antioxidant, heated to 185° C. and mixed at a high speed for 30 minutes, to get a mixture liquid;

Wherein the modified alginic acid is prepared following the steps below:

100 kg alginic acid is dissolved in 400 kg dimethyl sulfoxide, into which are added 8 kg 1-(3-dimethylaminopropyl)-3-ethyl carbodiimide hydrochloride and 10 kg N-hydroxy succinimide at 20° C. and reacted with stirring for 5 hours to get a reaction solution; 6 kg polyamine is added into the reaction solution and reacted with stirring at 60° C. for 15 hours to get a mixed solution; 450 kg deionized water is added into the mixed solution and dialyzed by a dialysis bag with a molecular weight of 3500 to get a dialysate; the dialysate is lyophilized to get the modified alginic acid;

The antioxidant is Antioxidant 3125;

② The mixture liquid obtained from step ① is injected into a spinning box, where it is jet spun, cooled by a quenching air case, and drawn to get a fiber mesh, the fiber mesh is hot rolled into cloth on a hot rolling machine, to get the algae modified pp spunbond non-woven fabric.

Embodiment 10

The algae modified pp spunbond non-woven fabric described in embodiment 5 is prepared by a method including the following steps:

① 95 kg polypropylene and 1.9 kg modified alginic acid are added into a horizontal double helical ribbon mixer, heated to 60° C., and mixed at a medium speed for 30 minutes, into which are then added 3 kg Polyethylene glycol 6000, 0.2 kg Polyvinyl pyrrolidone K30 and 0.5 kg antioxidant, heated to 185° C. and mixed at a high speed for 30 minutes, to get a mixture liquid;

Wherein the modified alginic acid is prepared following the steps below:

100 kg alginic acid is dissolved in 400 kg dimethyl sulfoxide, into which are added 8 kg 1-(3-dimethylaminopropyl)-3-ethyl carbodiimide hydrochloride and 10 kg N-hydroxy succinimide at 20° C. and reacted with stirring for 5 hours to get a reaction solution; 6 kg polyamine is added into the reaction solution and reacted with stirring at 60° C. for 15 hours to get a mixed solution; 450 kg deionized water is added into the mixed solution and dialyzed by a dialysis bag with a molecular weight of 3500 to get a dialysate; the dialysate is lyophilized to get the modified alginic acid;

The antioxidant is Antioxidant 3125;

② The mixture liquid obtained from step ① is injected into a spinning box, where it is jet spun, cooled by a quenching air case, and drawn to get a fiber mesh, the fiber mesh is hot rolled into cloth on a hot rolling machine, to get the algae modified pp spunbond non-woven fabric.

Comparative Embodiment 11

Employing the method of embodiment 10 with other parameters unchanged, the amount of alginate added is changed to 3.5 Kg.

Comparative Embodiment 12

Employing the method of embodiment 10 with other parameters unchanged, the amount of alginate added is changed to 4.0 Kg.

Comparative Embodiment 13

Employing the method of embodiment 10 with other parameters unchanged, the amount of alginate added is changed to 4.5 Kg.

Comparative Embodiment 14

Employing the method of embodiment 10 with other parameters unchanged, the amount of alginate added is changed to 0.09 Kg.

Comparative Embodiment 15

Employing the method of embodiment 10 with other parameters unchanged, the amount of alginate added is changed to 0.05 Kg.

The performances of the algae modified pp spunbond non-woven fabrics in basic embodiments 6~10 and comparative embodiments 11-13 are tested. The pp spunbond non-woven fabrics with the same gram weight as in the basic embodiments are employed in the comparative embodiments, the gram weights are both 20±0.5 g/cm². The air permeability of materials is tested according to ISO9237-1995 standard, and the breaking strength and elongation at break are tested according to GB/T 24218.3-2010, with the results shown in Table 1.

TABLE 1

|  | Air permeability/ mm/s | Breaking strength/ N/5 cm | Elongation at break/% | Antibacterial rate against *Staphylococcus aureus*/% | Antibacterial rate against *Escherichia coli*/% |
| --- | --- | --- | --- | --- | --- |
| Embodiment 6 | 989 | 60.72 | 51.18 | 99.20 | 99.50 |
| Embodiment 7 | 962 | 60.70 | 51.17 | 98.20 | 98.70 |
| Embodiment 8 | 975 | 60.81 | 51.22 | 98.50 | 99.00 |
| Embodiment 9 | 984 | 60.88 | 51.23 | 98.80 | 99.20 |
| Embodiment 10 | 990 | 60.89 | 51.24 | 99.90 | 99.90 |
| Comparative Embodiment 11 | 990 | 50.20 | 42.50 | 99.80 | 99.90 |
| Comparative Embodiment 12 | 989 | 50.30 | 42.60 | 99.90 | 99.80 |
| Comparative Embodiment 13 | 990 | 45.80 | 38.50 | 99.90 | 99.90 |
| Comparative Embodiment 14 | 658 | 60.82 | 51.22 | 84.30 | 83.60 |
| Comparative Embodiment 15 | 973 | 60.85 | 51.00 | 83.50 | 83.10 |

It can be seen from the data in Table 1 that, the algae modified pp spunbond non-woven fabrics of the invention have excellent air permeability which is more than 100% that of conventional non-woven fabric products; the breaking strength and the elongation at break are both about 20% higher than those of conventional pp spunbond non-woven fabrics. It can be seen that, the modified alginic acid with a molecular weight above 3500 and the dense interpenetrating network structure ensure the high mechanical strength and wear resistance of non-woven fabrics.

Meanwhile, it can be also concluded that, when the content of alginate in the prepared non-woven fabrics is between 0.1-2%, the prepared fiber has the best antibacterial property, and its physical properties can meet the needs of production; when the content of alginate is <0.1%, the air permeability and antibacterial property of the prepared non-woven fabrics are reduced significantly; when the content of alginate is ≥2%, the physical indexes of the prepared non-woven fabrics are also reduced significantly, which cannot meet the requirements of normal production and application obviously. In conclusion, the optimal content of alginate in the algae modified pp spunbond non-woven fabrics prepared in the invention is between 0.1-2%.

The hydroscopicities of the algae modified pp spunbond non-woven fabrics in embodiments 6~10 are tested, and pp spunbond non-woven fabrics with the same gram weights are used in the comparative embodiments, with the gram weights both at 20±0.5 g/cm². The water absorbing speed and capacity of the non-woven fabrics are determined. The water absorbing speed is determined as below: the algae modified pp spunbond non-woven fabrics in embodiments 6-10 are cut into square sheets of 10 cm*10 cm; 1 ml water is dropped onto the laboratory bench; the non-woven fabric sheets are allowed to approach water slowly; the time for the non-woven fabrics to absorb water completely, i.e., to be wetted absolutely, is recorded with a stop watch to determine the water absorbing speed. The water absorbing capacity is determined as below: the square sheets of 10 cm*10 cm are weighed and soaked in water for 10 s, taken out and weighed on a balance when no water drips from the non-woven fabrics, then the weights m of the non-woven fabrics are recorded, the water absorbing capacity per gram=(m−5)/5; with the results shown in Table 2.

Table 2 Test results of water absorbabilities of the algae modified pp spunbond non-woven fabrics in embodiments 6~10

TABLE 2

|  | Water absorbing speed | Water absorbing capacity (fold) | Convention moisture regain (%) |
| --- | --- | --- | --- |
| Embodiment 6 | 2.1 | 13.2 | 12.83 |
| Embodiment 7 | 1.6 | 12.5 | 8.59 |
| Embodiment 8 | 1.7 | 12.7 | 9.12 |
| Embodiment 9 | 1.9 | 13.0 | 12.15 |
| Embodiment 10 | 2.8 | 14.5 | 14.33 |
| Comparative Embodiment 11 | 3.1 | 14.8 | 14.75 |
| Comparative Embodiment 12 | 3.1 | 14.4 | 14.78 |
| Comparative Embodiment 13 | 3.2 | 14.9 | 14.83 |
| Comparative Embodiment 14 | 3.0 | 3.5 | 3.2 |
| Comparative Embodiment 15 | 3.0 | 3.6 | 3.3 |

Note: In the experiments of water absorbing capacity, the surfaces of conventional non-woven fabrics in the comparative embodiments are not stained with water.

It is demonstrated from the results of Table 2 that, the algae modified pp spunbond non-woven fabrics in embodiments 6~10 of the invention can absorb water rapidly and the surface remains dry after absorbing water; moreover, they can absorb more than 12 times their mass of water, the convention moisture regain is between 0.2~3.5%, so they have good hygroscopicity and good hydrophilcity.

The alginic acid used in the invention is commercially available, and there are no additional requirements for its specific indexes, unless otherwise required in the present invention.

The foregoing are only preferred embodiments of the invention, but are not limitations to the invention in any other forms. The present invention can be changed or modified to equivalent embodiments by any persons familiar with the art by using the above technical content as an inspiration. However, all the simple variations, equal changes and modifications to the above embodiments substantially according to the invention without deviating from the context of the technical scheme of the invention still fall within the protection scope of the claims of the invention.

What is claimed is:

1. A method for producing an alginate modified polypropylene spunbond non-woven fabric, which contains 0.1-2% by mass of alginate in the polypropylene spunbond non-woven fabric, the method comprising:
   adding polypropylene and alginate accounting for 0.1-2% of the total weight into a horizontal double helical ribbon mixer at a certain mass ratio to form a first mixture,
   heating the first mixture to 40-80° C.,
   mixing the first mixture at a medium speed for 20-40 minutes, and then adding polyethylene glycol, polyvinyl pyrrolidone and an antioxidant to the mixer to form a second mixture,
   heating the second mixture to 180-190° C., and mixing the second mixture at a high speed for 20-40 minutes, to form a mixture liquid,
   injecting the mixture liquid into a spinning box, spinning fibers from the mixture liquid, cooling the spun fibers with a quenching air case, and drawing the spun fibers to form a fiber mesh, and
   hot rolling the fiber mesh into cloth to form the alginate modified polypropylene spunbond non-woven fabric.

2. The method according to claim 1, wherein hot rolling is performed at a temperature of 140-150° C.

3. The method according to claim 1, wherein the mixture liquid is injected into the spinning box at a pressure of 2-5 MPa.

4. The method according to claim 1, further comprising generating the alginate by modifying alginic acid by performing the following steps:
   extracting alginic acid from natural algae,
   dissolving the alginic acid in a solvent to form a first solution,
   adding 1-(3-dimethylaminopropyl)-3-ethyl carbodiimide hydrochloride and N-hydroxy succinimide to the first solution at 10-35° C. and reacting with stirring for 5-10 hours to form a reaction solution,
   adding a polyamine to the reaction solution and reacting with stirring at 40-80° C. for 10-24 hours to form a mixed solution containing reaction molecules,
   adding deionized water to the mixed solution and dialyzing the mixed solution with a dialysis bag to separate reaction molecules with a molecular weight of less than 3500 to form a dialysate containing reaction molecules with a molecular weight above 3500, and
   lypophilizing the dialysate to form the alginate;
   wherein the solvent is N,N-dimethylformamide or dimethyl sulfoxide,
   wherein the polyamine is hexamethylenediamine or tri(2-aminoethyl)amine, and
   wherein a mass ratio of alginic acid, the solvent, 1-(3-dimethylaminopropyl)-3-ethyl carbodiimide hydrochloride, N-hydroxy succinimide, polyamine and deionized water is 100:300-600:5-15:7-14:1-10:300-600.

5. The method according to claim 1, wherein the the polyethylene glycol is Polyethylene glycol 4000 or Polyethylene glycol 6000.

6. The method according to claim 5, wherein the polyvinyl pyrrolidone is Polyvinyl pyrrolidone K30.

* * * * *